United States Patent
Obregon et al.

(10) Patent No.: US 11,943,772 B2
(45) Date of Patent: Mar. 26, 2024

(54) METHOD AND APPARATUSES FOR PERFORMING UNSCHEDULED UPLINK TRANSMISSIONS ON AN UNLICENSED BAND

(71) Applicant: TELEFONAKTIEBOLAGET LM ERICSSON (PUBL), Stockholm (SE)

(72) Inventors: Evanny Obregon, Solna (SE); Jung-Fu Cheng, Fremont, CA (US); Amitav Mukherjee, Fremont, CA (US); Reem Karaki, Aachen (DE); Du Ho Kang, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 189 days.

(21) Appl. No.: 16/088,484

(22) PCT Filed: Apr. 21, 2017

(86) PCT No.: PCT/SE2017/050395
§ 371 (c)(1),
(2) Date: Sep. 26, 2018

(87) PCT Pub. No.: WO2017/184071
PCT Pub. Date: Oct. 26, 2017

(65) Prior Publication Data
US 2019/0110310 A1   Apr. 11, 2019

Related U.S. Application Data

(60) Provisional application No. 62/326,292, filed on Apr. 22, 2016.

(51) Int. Cl.
*H04W 16/14* (2009.01)
*H04W 72/21* (2023.01)
(Continued)

(52) U.S. Cl.
CPC ......... *H04W 72/21* (2023.01); *H04W 72/541* (2023.01); *H04W 74/02* (2013.01);
(Continued)

(58) Field of Classification Search
CPC ............ H04W 72/1284; H04W 74/02; H04W 72/082; H04W 72/1289; H04W 71/1289; H04W 74/0808; H04W 72/21
See application file for complete search history.

(56) References Cited

U.S. PATENT DOCUMENTS

2013/0231147 A1 * 9/2013 Li ......................... H04W 24/02
455/501
2014/0341018 A1 11/2014 Bhushan et al.
(Continued)

FOREIGN PATENT DOCUMENTS

| WO | 2016013781 A1 | 1/2016 |
| WO | 2016017327 A1 | 2/2016 |
| WO | 2017165405 A2 | 9/2017 |

OTHER PUBLICATIONS

3GPP TSG-RAN WG1 meeting #112, R1-2301980 Title: Modaratyor summary of discussion for LS reply on SL failure indication (Year: 2023).*

(Continued)

*Primary Examiner* — Christopher M Crutchfield
*Assistant Examiner* — Abusayeed M Haque
(74) *Attorney, Agent, or Firm* — Withrow & Terranova, PLLC

(57) ABSTRACT

Method for performing an unscheduled uplink transmission by a user equipment UE, in an unlicensed portion of a radio spectrum, the method comprising: performing, by the UE, a listen before talk, LBT, operation in the unlicensed portion of the radio spectrum, wherein the LBT operation includes sensing the portion of the radio spectrum for a pre-deter-
(Continued)

mined minimum amount of time for traffic; and performing, if no traffic was sensed, the unscheduled uplink transmission, by the UE, of data in an unscheduled mode of operation for at least one transmission burst.

18 Claims, 15 Drawing Sheets

(51) Int. Cl.
  *H04W 72/541* (2023.01)
  *H04W 74/02* (2009.01)
  *H04W 74/08* (2009.01)
  *H04L 1/1812* (2023.01)
  *H04W 72/23* (2023.01)
  *H04W 88/02* (2009.01)

(52) U.S. Cl.
  CPC .......... *H04L 1/1812* (2013.01); *H04W 72/23* (2023.01); *H04W 88/02* (2013.01)

(56) References Cited

U.S. PATENT DOCUMENTS

| | | | |
|---|---|---|---|
| 2014/0362780 A1 | 12/2014 | Malladi et al. | |
| 2015/0223284 A1* | 8/2015 | Jain | H04L 67/10 370/329 |
| 2016/0037544 A1* | 2/2016 | Wang | H04W 72/1215 370/329 |
| 2016/0100407 A1* | 4/2016 | Gaal | H04L 5/0051 370/329 |
| 2016/0309467 A1* | 10/2016 | Yerramalli | H04W 72/0446 |
| 2016/0309512 A1* | 10/2016 | Li | H04W 74/0816 |
| 2017/0238311 A1* | 8/2017 | Hooli | H04W 72/23 370/329 |
| 2017/0265225 A1* | 9/2017 | Takeda | H04W 16/32 |
| 2017/0367058 A1* | 12/2017 | Pelletier | H04W 52/246 |
| 2018/0063777 A1* | 3/2018 | Muller | H04W 48/18 |
| 2018/0139780 A1* | 5/2018 | Kang | H04W 16/14 |
| 2021/0195643 A1* | 6/2021 | Talarico et al. | H04L 5/0051 370/329 |

OTHER PUBLICATIONS

3GPP TSG-RAN WG1 Meeting#112, R1-2301709 Title: Discussion of RAN2 LS on SL LBT failure indication and consistent SL LBT failure (Year: 2023).*
3GPP TR 36.889, "3rd Generation Partnership Project; Technical Specification Group Radio Access Network; Study on Licensed-Assisted Access to Unlicensed Spectrum; (Release 13)", Jun. 18, 2015.
3GPP TSG RAN WG1 Meeting #82, "UL LBT and DL/UL Frame Structure for LAA", R1-154574, Alcatel-Lucent Shanghai Bell, Alcatel-Lucent, Aug. 25-28, 2015, Beijing, China, Retrieved from internet: http://www.3gpp.org/ftp/Meetings_3GPP_SYNC/RAM1/Docs/.
3GPP TSG RAN WG1 Meeting #82bis, "Evaluation of some sensing options for UL LBT", R1-155155, Oct. 5-9, 2015, Malmo, Sweden.
3GPP TSG RAN WG1 Meeting #82bis, "UL LBT for self-carrier scheduling", R1-155312, Oct. 5-9, 2015, Malmo, Sweden, Retrieved from internet: http://www.3gpp.org/ftp/Meetings_3GPP_SYNC/RAN1_Docs/.
3GPP TSG RAN WG1 Meeting #84, "On UL Channel Access Procedures for Enhanced LAA", R1-161001, Feb. 15-19, 2016, St. Julien's, Malta, Retrieved from internet: http://www.3gpp/org/ftp/tsg_ran/WG1_RL1/TSGR1_84/Docs/.
3GPP TSG-RAN WG2 Meeting #90, "Uplink transmission for LAA", R2-152214, May 25-29, 2015, Fukuoka, Japan.
International Search Report and Written Opinion, dated Feb. 11, 2017, from corresponding PCT Application No. PCT/SE2017/050395.
3GPP, LTE; "Medium Access Control (MAC) protocol specification"; 3GPP TS 36.321, V12.1.0 (Mar. 2014), 3rd Generation Partnership Project; Technical Specification Group Radio Access Network; Evolved Universal Terrestrial Radio Access (E-UTRA); Release 12; Mar. 2014; 57 pages.
3GPP, LTE; "Multiplexing and channel coding"; 3GPP TS 36.212, V12.4.0 (Mar. 2015), 3rd Generation Partnership Project; Technical Specification Group Radio Access Network; Evolved Universal Terrestrial Radio Access (E-UTRA); Release 12; Mar. 2015; 94 pages.
3GPP, LTE; "Physical Channels and Modulation"; 3GPP TS 36.211, V12.3.0 (Sep. 2014), 3rd Generation Partnership Project; Technical Specification Group Radio Access Network; Evolved Universal Terrestrial Radio Access (E-UTRA); Release 12; Sep. 2014; 124 pages.
3GPP, LTE; "Physical layer procedures" 3GPP TS 36.213, V12.3.0 (Sep. 2014), 3rd Generation Partnership Project; Technical Specification Group Radio Access Network; Evolved Universal Terrestrial Radio Access (E-UTRA); Release 12; Sep. 2009; 212 pages.
Intel Corporation, "R1-160428: Introduction of Non-Scheduled UL Operation for eLAA," 3GPP TSG RAN WG1 Meeting #84, Feb. 15-19, 2016, St. Julian's, Malta, 5 pages.
Examination Report for European Patent Application No. 17724130.4, dated Feb. 21, 2020, 7 pages.
Extended European Search Report for European Patent Application No. 20192286.1, dated Sep. 28, 2020, 16 pages.

* cited by examiner

One OFDM symbol including cyclic prefix

*Aggregated bandwidth of 100 MHz* activating UEs, that are in a sensing range of each other, to operate in an unscheduled mode of operation — 2014 assigning, by the eNB, a different backoff offset to each UE which is operating in an unscheduled mode of operation — 2016

FIG. 12 B

METHOD AND APPARATUSES FOR PERFORMING UNSCHEDULED UPLINK TRANSMISSIONS ON AN UNLICENSED BAND

TECHNICAL FIELD

The present invention generally relates to communication networks and, more particularly, to mechanisms and techniques for scheduling uplink transmissions.

BACKGROUND

The 3GPP work on "Licensed-Assisted Access" (LAA) intends to allow long term evolution (LTE) equipment to also operate in the unlicensed radio spectrum. Candidate bands for LTE operation in the unlicensed spectrum include 5 GHz, 3.5 GHz, etc. The unlicensed spectrum is used as a complement to the licensed spectrum or allows completely standalone operation.

For the case of unlicensed spectrum used as a complement to the licensed spectrum, devices connect in the licensed spectrum (primary cell or PCell) and use carrier aggregation to benefit from additional transmission capacity in the unlicensed spectrum (secondary cell or SCell). The carrier aggregation (CA) framework allows to aggregate two or more carriers with the condition that at least one carrier (or frequency channel) is in the licensed spectrum and at least one carrier is in the unlicensed spectrum. In the standalone (or completely unlicensed spectrum) mode of operation, one or more carriers are selected solely in the unlicensed spectrum.

Regulatory requirements, however, may not permit transmissions in the unlicensed spectrum without prior channel sensing, transmission power limitations or imposed maximum channel occupancy time. Since the unlicensed spectrum must be shared with other radios of similar or dissimilar wireless technologies, a so called listen-before-talk (LBT) method needs to be applied. LBT involves sensing the medium for a pre-defined minimum amount of time and backing off if the channel is busy. Due to the centralized coordination and dependency of terminal devices on the base-station (eNB) for channel access in LTE operation and imposed LBT regulations, LTE uplink (UL) performance is especially hampered. UL transmission is becoming more and more important with user-centric applications and the need for pushing data to the cloud.

Today, the unlicensed 5 GHz spectrum is mainly used by equipment implementing the IEEE 802.11 Wireless Local Area Network (WLAN) standard. This standard is known under its marketing brand "Wi-Fi" and allows completely standalone operation in the unlicensed spectrum. Unlike the case in LTE, Wi-Fi terminals can asynchronously access the medium and thus show better UL performance characteristics especially in congested network conditions.

LTE uses orthogonal frequency division multiplexing (OFDM) in the downlink and DFT-spread OFDM (also referred to as single-carrier FDMA) in the uplink. The basic LTE downlink physical resource can thus be seen as a time-frequency grid as illustrated in FIG. 1 where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions are organized into radio frames of 10 ms, each radio frame consisting of ten equally-sized subframes of length Tsubframe=1 ms as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 μs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control, including control signaling 302 is illustrated in FIG. 3. The reference symbols 304 shown in FIG. 3 are the cell specific reference symbols (CRS) and are used to support multiple functions including fine time, frequency synchronization and channel estimation for certain transmission modes.

Uplink transmissions are dynamically scheduled, i.e., in each downlink subframe the base station transmits control information about which terminals should transmit data to the eNB in subsequent subframes, and upon which resource blocks the data is transmitted. The uplink resource grid is comprised of data and uplink control information in the PUSCH, uplink control information in the PUCCH, and various reference signals such as demodulation reference signals (DMRS) and sounding reference signals (SRS). DMRS are used for coherent demodulation of PUSCH and PUCCH data, whereas SRS is not associated with any data or control information but is generally used to estimate the uplink channel quality for purposes of frequency-selective scheduling. An example uplink subframe is shown in FIG. 4. Note that UL DMRS and SRS are time-multiplexed into the UL subframe, and SRS are always transmitted in the last symbol of a normal UL subframe. The PUSCH DMRS is transmitted once every slot for subframes with normal cyclic prefix, and is located in the fourth and eleventh SC-FDMA symbols.

From LTE Rel-11 onwards, DL or UL resource assignments can also be scheduled on the enhanced Physical Downlink Control Channel (EPDCCH). For Rel-8 to Rel-10 only the Physical Downlink Control Channel (PDCCH) is available. Resource grants are UE specific and are indicated by scrambling the DCI Cyclic Redundancy Check (CRC) with the UE-specific C-RNTI identifier. A unique C-RNTI is assigned by a cell to every UE associated with it, and can take values in the range 0001-FFF3 in hexadecimal format. A UE uses the same C-RNTI on all serving cells.

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e., that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least the possibility to have, the same structure as a Rel-8 carrier. CA is illustrated in FIG. 5. A CA-capable UE is assigned a primary cell (PCell) which is always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal. A terminal may, for example, support more downlink CCs than uplink CCs, even though the cell is configured with the same number of uplink and downlink CCs.

In addition, a key feature of carrier aggregation is the ability to perform cross-carrier scheduling. This mechanism allows a (E)PDCCH on one CC to schedule data transmissions on another CC by means of a 3-bit Carrier Indicator Field (CIF) inserted at the beginning of the (E)PDCCH messages. For data transmissions on a given CC, a UE expects to receive scheduling messages on the (E)PDCCH on just one CC—either the same CC, or a different CC via cross-carrier scheduling; this mapping from (E)PDCCH to PDSCH is also configured semi-statically.

In LTE the uplink access is typically controlled by an eNB, i.e., scheduled. In this case the UE would report to the eNB when data is available to be transmitted, e.g., by sending a scheduling request message (SR). Based on this, the eNB would grant the resources and relevant information to the UE in order to carry out the transmission of a certain size of data. The assigned resources are not necessarily sufficient for the UE to transmit all the available data. Therefore, it is possible that the UE sends a buffer status report (BSR) control message in the granted resources, in order to inform the eNB about the correct size and updated size of the data waiting for transmission. Based on that, the eNB would further grant the resources to carry on with the UE uplink transmission of the corrected size of data.

In more detail, every time new data arrives at the UE's empty buffer, the following procedure should be performed: (1) Using Physical Uplink Control Channel (PUCCH), the UE informs the network that it needs to transmit data by sending a Scheduling Request (SR) indicating that the UE needs uplink access. The UE has periodic timeslots for SR transmissions (typically on a 5, 10, or 20 ms interval). (2) Once the eNB receives the SR request bit, the eNB responds with a small "uplink grant" that is just large enough to communicate the size of the pending buffer. The reaction to this request typically takes 3 ms. (3) After the UE receives and processes (takes about 3 ms) its first uplink grant, it typically sends a Buffer Status Report (BSR) that is a media access control (MAC) Control Element (MAC CE) used to provide information about the amount of pending data in the uplink buffer of the UE. If the grant is big enough, the UE sends data from its buffer within this transmission as well. Whether the BSR is sent depends also on conditions specified in 3GPP TS 36.321. (4) The eNB receives the BSR message, allocates the necessary uplink resources and sends back another uplink grant that will allow the device to drain its buffer.

Adding it all up, about 16 ms (+time to wait for PUCCH transmission opportunity) of delay can be expected between data arrival at the empty buffer in the UE and reception of this data in the eNB. In case the UE is not RRC connected in LTE or lost its uplink synchronization since it did not transmit or receive anything for a certain time, the UE would use the random access procedure to connect to the network, obtain synchronization and also send the SR. If this is the case the procedure until the data can be sent would take even longer than the SR transmission on PUCCH.

In the LTE system, the transmission formats and parameters are controlled by the eNB. Such downlink control information (DCI) typically contains the following: resources allocated for UL transmission (including whether frequency hopping is applied); modulation and coding scheme; redundancy versions; new data indicator; transmit power control command; information about demodulation reference symbol (DMRS); in case of cross-carrier scheduling, the target carrier index is also included; and other applicable control information on UL transmissions The DCI is first protected by 16-bit CRC. The CRC bits are further scrambled by the UE assigned identity (C-RNTI). The DCI and scrambled CRC bits are further protected by convolutional coding. The encoded bits are transmitted from the eNB to UE using either PDCCH or EPDCCH.

In typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle.

A general illustration of the listen before talk (LBT) mechanism of Wi-Fi is shown in FIG. 6. After a Wi-Fi station A transmits a data frame to a station B, station B shall transmit the ACK frame back to station A with a delay of 16 μs. Such an ACK frame is transmitted by station B without performing a LBT operation. To prevent another station interfering with such an ACK frame transmission, a station shall defer for a duration of 34 μs (referred to as DIFS) after the channel is observed to be occupied before assessing again whether the channel is occupied. Therefore, a station that wishes to transmit first performs a CCA by sensing the medium for a fixed duration DIFS. If the medium is idle then the station assumes that it may take ownership of the medium and begin a frame exchange sequence. If the medium is busy, the station waits for the medium to go idle, defers for DIFS, and waits for a further random backoff period.

In the above basic protocol, when the medium becomes available, multiple Wi-Fi stations may be ready to transmit, which can result in collision. To reduce collisions, stations intending to transmit select a random backoff counter and defer for that number of slot channel idle times. The random backoff counter is selected as a random integer drawn from a uniform distribution over the interval of [0, CW]. The default size of the random backoff contention window, CWmin, is set in the IEEE specifications. Note that collisions can still happen even under this random backoff protocol when there are many stations contending for the channel access. Hence, to avoid recurring collisions, the backoff contention window size CW is doubled whenever the station detects a collision of its transmission up to a limit, CWmax, also set in the IEEE specs. When a station succeeds in a transmission without collision, it resets its random backoff contention window size back to the default value CWmin.

For a device not utilizing the Wi-Fi protocol in Europe, EN 301.893, v. 1.7.1 provides the following requirements and minimum behavior for the load-based clear channel assessment. (1) Before a transmission or a burst of transmissions on an Operating Channel, the equipment shall perform a Clear Channel Assessment (CCA) check using "energy detect". The equipment shall observe the Operating Channel(s) for the duration of the CCA observation time which shall be not less than 20 μs. The CCA observation time used by the equipment shall be declared by the manufacturer. The Operating Channel shall be considered occupied if the energy level in the channel exceeds the threshold corresponding to the power level given in point (5) below. If the equipment finds the channel to be clear, it may transmit immediately (see point (3) below).

(2) If the equipment finds an Operating Channel occupied, it shall not transmit in that channel. The equipment shall perform an Extended CCA check in which the Operating Channel is observed for the duration of a random factor N multiplied by the CCA observation time. N defines the number of clear idle slots resulting in a total Idle Period that need to be observed before initiation of the transmission. The value of N shall be randomly selected in the range 1 . . . q every time an Extended CCA is required and the value stored in a counter. The value of q is selected by the manufacturer in the range 4 . . . 32. This selected value shall be declared by the manufacturer (see clause 5.3.1 q). The counter is decremented every time a CCA slot is considered to be "unoccupied". When the counter reaches zero, the equipment may transmit.

(3) The total time that an equipment makes use of an Operating Channel is the Maximum Channel Occupancy Time which shall be less than (13/32)×q ms, with q as defined in point 2 above, after which the device shall perform the Extended CCA described in point 2 above.

(4) The equipment, upon correct reception of a packet which was intended for this equipment, can skip CCA and immediately (see note 4) proceed with the transmission of management and control frames (e.g. ACK and Block ACK frames). A consecutive sequence of transmissions by the equipment, without it performing a new CCA, shall not exceed the Maximum Channel Occupancy Time as defined in point (3) above. For the purpose of multi-cast, the ACK transmissions (associated with the same data packet) of the individual devices are allowed to take place in a sequence.

(5) The energy detection threshold for the CCA shall be proportional to the maximum transmit power (PH) of the transmitter: for a 23 dBm e.i.r.p. transmitter the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−PH (assuming a 0 dBi receive antenna and PH specified in dBm e.i.r.p.).

An example to illustrate the EN 301.893 LBT is provided in FIG. 7.

Up to now, the spectrum used by LTE has been dedicated to LTE. This has the advantage that LTE system does not need to care about the coexistence issue and the spectrum efficiency can be maximized. However, the radio spectrum allocated to LTE is limited and cannot meet the ever increasing demand for larger throughput from applications/ services. Therefore, a new study item was carried out in 3GPP on extending LTE to exploit unlicensed spectrum in addition to licensed spectrum.

Licensed-Assisted Access (LAA) in the unlicensed spectrum, as shown in FIG. 8, implies that a UE is connected to a PCell in the licensed band and one or more SCells in the unlicensed band. In this application, a secondary cell in unlicensed spectrum is denoted as LAA secondary cell (LAA SCell). The LAA SCell may operate in DL-only mode or operate with both UL and DL traffic. Moreover, in future scenarios LTE nodes may operate in standalone mode in license-exempt channels without assistance from a licensed cell. Unlicensed spectrum can, by definition, be simultaneously used by multiple different technologies. Therefore, LAA as described above needs to consider coexistence with other systems such as IEEE 802.11 (Wi-Fi).

To coexist fairly with the Wi-Fi system, transmission on the SCell shall conform to LBT protocols in order to avoid collisions and causing severe interference to on-going transmissions. This includes both performing LBT before commencing transmissions, and limiting the maximum duration of a single transmission burst. The maximum transmission burst duration is specified by country and region-specific regulations, for e.g., 4 ms in Japan and 13 ms according to EN 301.893.

Channel access mechanism for LTE has primarily been designed for licensed spectrum where eNB has full control of managing channel access and resource management. With the introduction of LTE operation in the unlicensed spectrum, LTE needs to comply with a number of regulatory requirements; such as LBT, maximum contiguous channel occupancy and radio duty cycle limitations. LTE operation with LBT leads to non-deterministic channel access that depends on the channel availability and the state of the back-off mechanism. Moreover, LTE should coexist with Wi-Fi technology that has a contention-based channel access mechanism, which is fundamentally different from the one of LTE.

For the LTE UL channel access, both UE and eNB need to perform LBT operations corresponding to the scheduling request, scheduling grant and data transmission phases. Acknowledgment transmission falls under a special regulatory case of control frame transmission, where a relatively faster CCA operation is allowed. In contrast, Wi-Fi terminals only need to perform LBT once in the UL data transmission phase. Moreover, Wi-Fi terminals can asynchronously send data compared to the synchronized LTE system. Thus, Wi-Fi terminals have a natural advantage over LTE terminals in UL data transmission, and show superior performance in collocated deployment scenarios as seen in our simulation studies. Overall study results show that Wi-Fi has a better uplink performance than LTE particularly in low-load or less congested network conditions. As the network congestion or load is increased, the LTE channel access mechanism (TDMA type) becomes more efficient, but Wi-Fi uplink performance is still superior. Therefore, LTE uplink channel access mechanism needs to be modified to overcome the impact of the lack of channel availability and probability of collisions, which are inherit problems of the unlicensed spectrum.

Thus, there is a need to provide methods and devices that overcome the above-described drawbacks.

SUMMARY

According to an exemplary embodiment, there is a method for performing an unscheduled uplink transmission by a user equipment (UE) in an unlicensed portion of a radio spectrum, the method comprising: performing, by the UE, a listen before talk (LBT) operation in the unlicensed portion of the radio spectrum, wherein the LBT operation includes sensing the portion of the radio spectrum for a pre-determined minimum amount of time for traffic; and performing, if no traffic was sensed, the unscheduled uplink transmission, by the UE, of data in an unscheduled mode of operation for at least one transmission burst.

According to an embodiment, the method can further include: activating, after transmitting the at least one transmission burst, a schedule based channel access mechanism, wherein an eNodeB (eNB) controls the UE's uplink access; and receiving, by the UE after transmitting the at least one transmission burst, an uplink transmission grant via cross carrier scheduling. The uplink transmission grant can allow for scheduling data on another carrier in a licensed portion or the unlicensed portion of the radio spectrum.

According to an embodiment, the method can include: unscheduled uplink transmissions which are restricted in time to pre-specified time windows. According to another embodiment, the method can further include: receiving, at the UE, an uplink transmission grant, transmitting, by the UE, an uplink transmission burst of new data based on the received uplink transmission grant; and sending, by the UE, an unscheduled retransmission for the new data if a new uplink grant or HARQ ACK/NACK is not received from the eNB within a pre-specified time window.

According to an embodiment, the steps of performing, by the UE, a listen before talk operation in the unlicensed portion of the radio spectrum; and performing the unscheduled uplink transmission, by the UE, of data in an unscheduled mode of operation for at least one transmission burst can be repeated until an earliest opportunity to transmit a scheduling request (SR) occurs. The transmission of the SR can occur on one of a licensed carrier or an unlicensed carrier.

According to an embodiment, the method can include: embedding, by the UE, an identification of the UE in a first uplink transmission burst when in the unscheduled mode of operation. The identification of the UE can be embedded in a first single carrier frequency division multiple access (SC-FDMA) symbol of the first uplink transmission burst. Alternatively, the method can include: embedding the identification of the UE in a first SC-FDMA symbol of every uplink transmission burst when in an unscheduled mode of operation. Additionally, the method can include: transmitting a corresponding downlink control information (DCI) of the uplink transmission burst when in an unscheduled mode of operation.

According to an embodiment, the method can include: wherein when performing uplink transmissions in the unscheduled mode of operation, the UE transmits on an interlace portion of a full bandwidth of the radio spectrum, and wherein the full bandwidth of the radio spectrum includes a plurality of interlace portions whose frequencies do not overlap. The interlace portion can be assigned by the eNB. Alternatively, the interlace portion can be based on the UE's identification.

According to an embodiment, the method can include: wherein switching between the unscheduled mode of operation and the scheduled mode of operation is determined by the UE. Alternatively, wherein switching between the unscheduled mode of operation and the scheduled mode of operation is determined by the eNB.

According to an embodiment, the method can include: prioritizing between a scheduled uplink transmission burst and an unscheduled uplink transmission burst by having different transmission start times when if both transmission bursts have a same back-off timing. Alternatively, reserving, by the eNB, a number of interlaces for unscheduled uplink transmissions.

According to an embodiment, the method can include: informing neighboring eNBs whenever an unscheduled mode of operation is active for at least one UE; receiving information from the neighboring eNBs associated with a level of interference when the level of interference is greater than a pre-determined threshold; and instructing the at least one UE to switch from the unscheduled mode of operation to a scheduled mode of operation.

According to an embodiment, the method can include: activating UEs to operate in an unscheduled mode of operation that are in a sensing range of each other, wherein the eNB estimates which UEs are out of the sensing range based on the UEs measurement reports which include an average interference level. According to an embodiment the method can include: assigning, by the eNB, a different backoff offset to each UE which is operating in an unscheduled mode of operation, wherein the backoff offset is a function of a contention window size.

According to embodiments, various method steps can be performed by either the UE or the eNB.

According to an embodiment, there is a user equipment (UE) configured to perform an unscheduled uplink transmission in an unlicensed portion of a radio spectrum, the UE comprising: a processor which performs a listen before talk operation in the unlicensed portion of the radio spectrum; and a transceiver which performs the unscheduled uplink transmission of data in an unscheduled mode of operation for at least one transmission burst.

According to an embodiment, there is an a method for an eNodeB (eNB) for an unscheduled uplink transmission in an unlicensed portion of a radio spectrum, the method comprising: controlling a user equipment's UE's uplink access, after receiving a at least one transmission burst in an unscheduled mode of operation from the UE, using a schedule based channel access mechanism; wherein controlling the UE's uplink access comprises: transmitting, to the UE, an uplink transmission grant for scheduled-based channel access.

According to an embodiment, there is a method for a user equipment (UE) for performing an unscheduled uplink transmission in an unlicensed portion of a radio spectrum, the method comprising: performing, by the UE, a listen before talk (LBT) operation in the unlicensed portion of the radio spectrum, wherein the LBT operation comprises sensing the portion of the radio spectrum for a pre-determined minimum amount of time for traffic; and, if no traffic was sensed, performing the unscheduled uplink transmission, by the UE, of data in an unscheduled mode of operation for at least one transmission burst.

According to an embodiment, there is an eNodeB (eNB) configured for an unscheduled uplink transmission in an unlicensed portion of a radio spectrum, the eNB comprising a processor, a memory, said memory comprising instructions executable by said processor whereby the eNB is operative to: control a user equipment's UE's uplink access, after receiving a at least one transmission burst in an unscheduled mode of operation from the UE, using a schedule based channel access mechanism; wherein controlling the UE's uplink access comprises: transmit, to the UE, an uplink transmission grant for scheduled-based channel access.

According to some embodiments methods described above may also be implemented by apparatus, devices, computer readable medium, computer program products and functional implementations.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
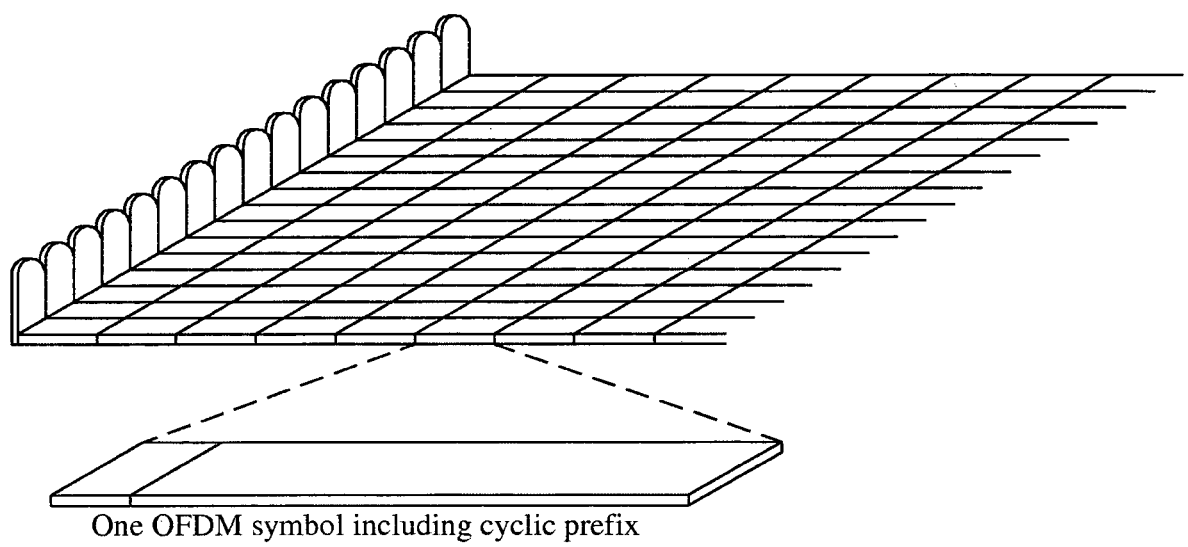
FIG. 1 shows a long term evolution (LTE) downlink physical resource.
Figure 2:
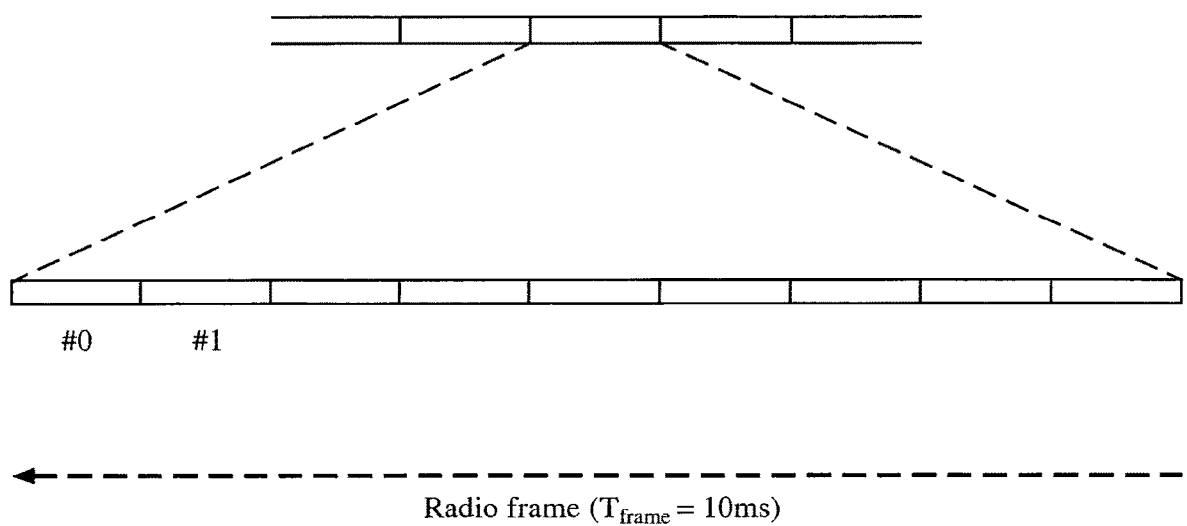
FIG. 2 illustrates an LTE time-domain structure.
Figure 3:
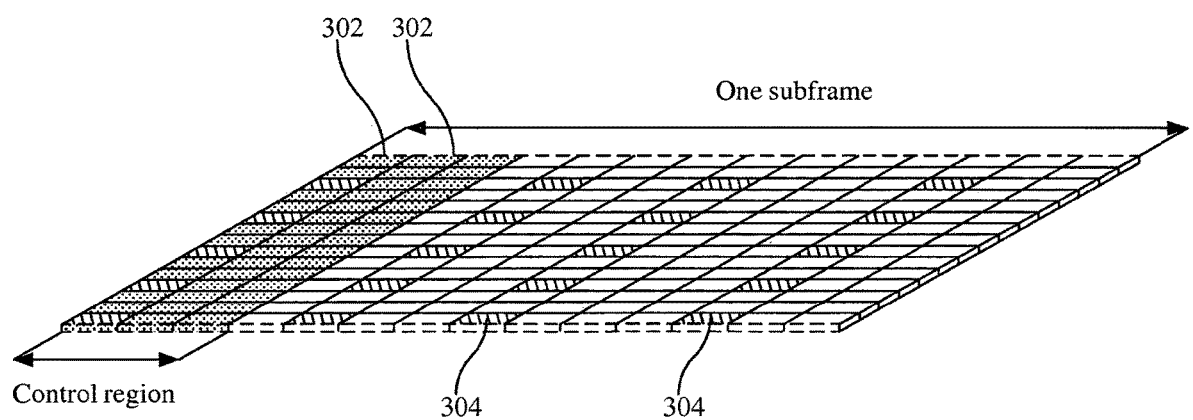
FIG. 3 shows a downlink subframe.
Figure 4:
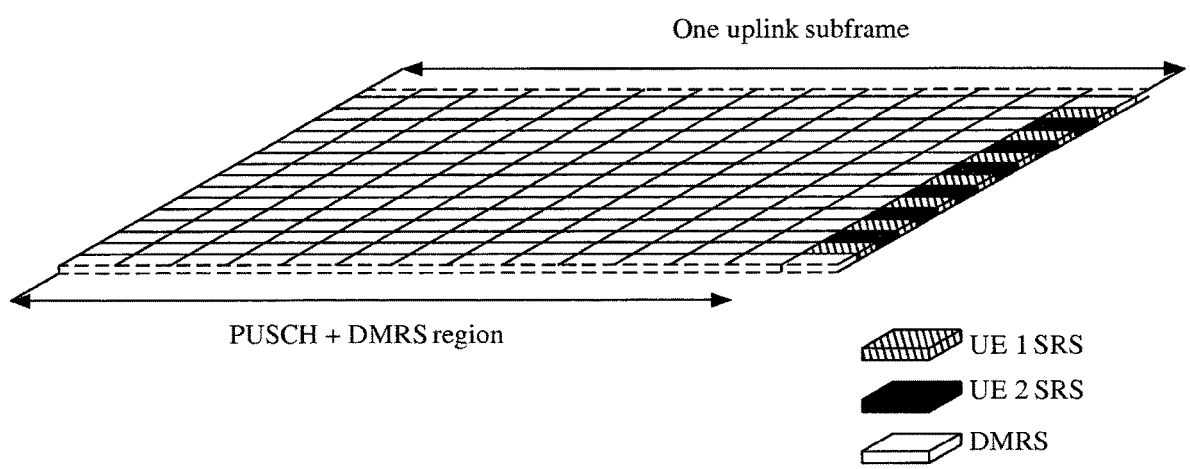
FIG. 4 shows an uplink subframe.
Figure 5:
FIG. 5 illustrates carrier aggregation.
Figure 6:
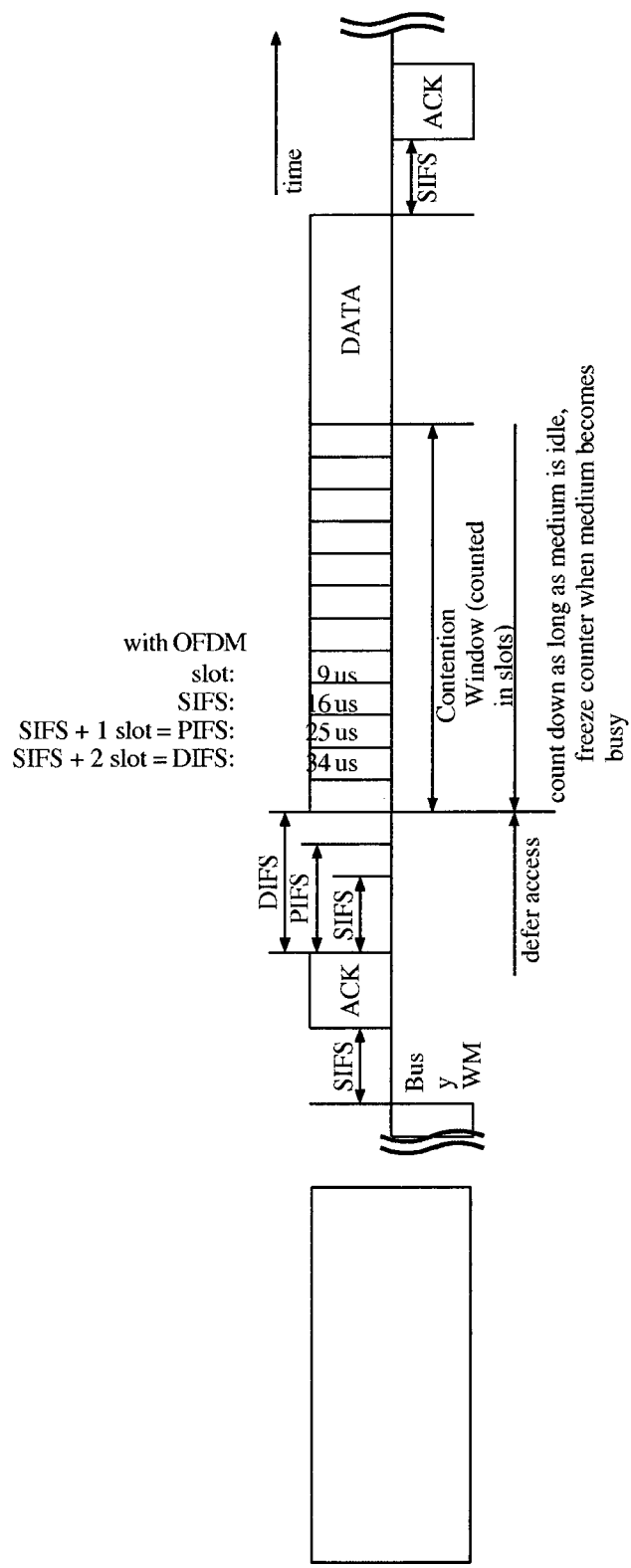
FIG. 6 illustrates an implementation of listen before talk (LBT) in Wi-Fi.
Figure 7:
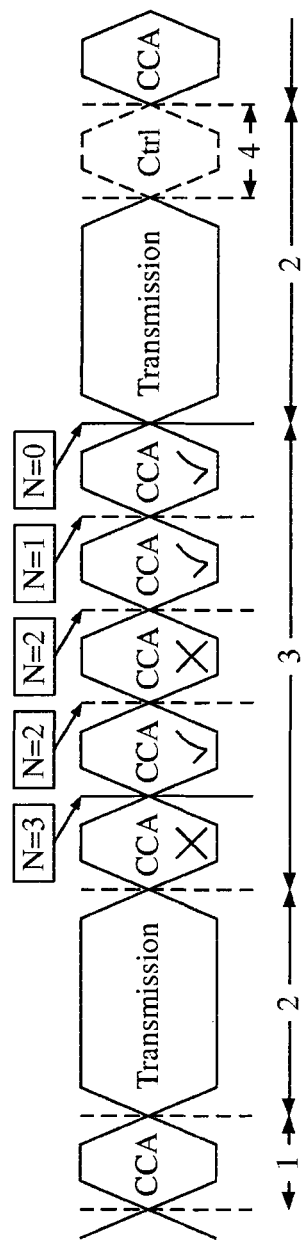
FIG. 7 shows an implementation of LBT according to EN 301.893.
Figure 8:
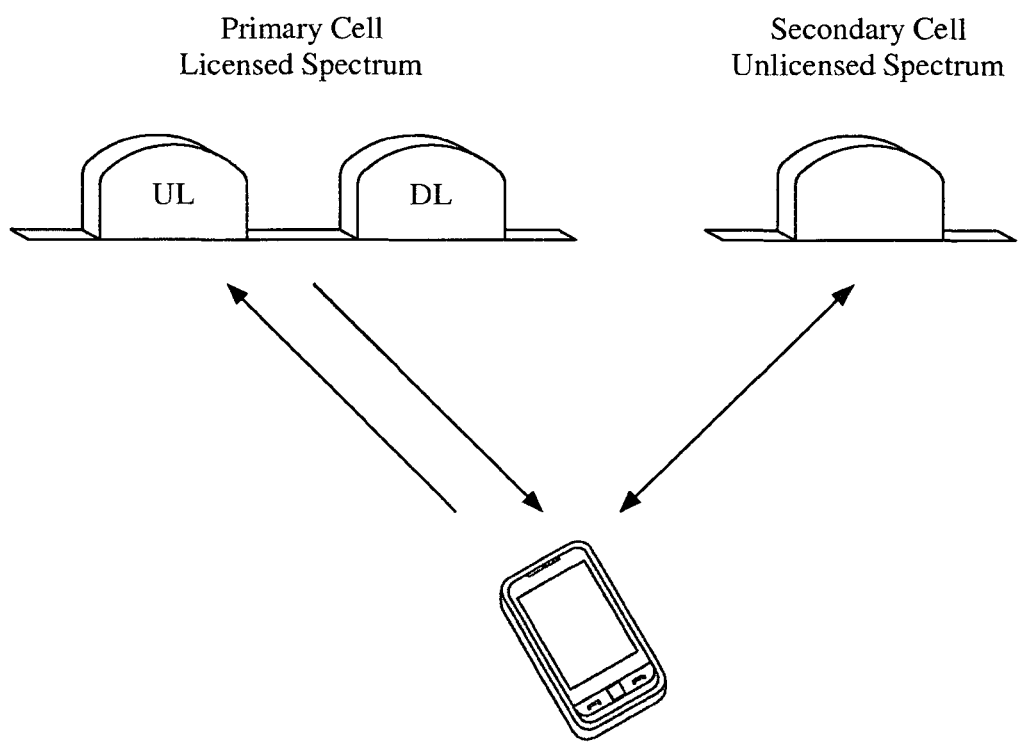
FIG. 8 depicts licensed assisted access to unlicensed spectrum using LTE carrier aggregation.

The following description of the embodiments refers to the accompanying drawings. The same reference numbers in different drawings identify the same or similar elements. The following detailed description does not limit the invention. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Embodiments described herein allow more flexible long term evolution (LTE) uplink (UL) transmissions in unlicensed spectrum that considers a mixture of contention-based and scheduled-based channel access principles. Embodiments generate higher LTE user equipment (UE) probabilities of getting access to the medium. The UE can avoid performing two listen before talk (LBT) operations corresponding to the scheduling request and scheduling grant. Thus, LTE UL performance in unlicensed spectrum is improved. UL transmission efficiency (in terms of data throughput) is improved in unlicensed carriers since the latency between UL grant and PUSCH transmission is reduced. At low load, there is a UL latency reduction and higher channel utilization for UL access. In the embodiments described below LBT and Clear Channel Assessment (CCA) may be interchangeably used.

The following embodiments describe how to allow more flexible LTE UL transmissions in unlicensed spectrum that considers a mixture of contention-based and scheduled-based channel access principles. It is to be understood that the proposed methods also apply to different variations of LTE operating in unlicensed spectrum, such as LTE-U and standalone LTE-U.

A non-prefixed term in this disclosure is to be understood in the LTE sense unless otherwise stated. However, any term designating an object or operation known from LTE is expected to be reinterpreted functionally in view of NR specifications. Examples: An LTE radio frame may be functionally equivalent to an NR frame, considering that both have a duration of 10 ms. An LTE eNB may be functionally equivalent to an NR gNB, since their functionalities as downlink transmitter are at least partially overlapping. The least schedulable resource unit in LTE may be reinterpreted as the least schedulable resource unit in NR. The shortest data set for which LTE acknowledgement feedback is possible may be reinterpreted as the shortest data set for which NR acknowledgement feedback is possible. Therefore, even though some embodiments of this disclosure have been described using LTE-originated terminology, they remain fully applicable to NR technology.

According to an embodiment, a UE can perform LBT to gain uplink channel access whenever the UL data arrives without having an UL grant from the eNB (or base station). UE will transmit using unscheduled mode for first N transmission bursts. Note that the value of N could be set according to different criteria (e.g. load conditions, number of collisions, traffic type, etc.).

After the first N uplink transmission bursts are finalized, scheduled-based channel access mechanism is activated and the eNB is again controlling the uplink access. As a non-limiting example, self-carrier scheduling can be used. The eNB sends the grant on the same carrier as the data transmissions is scheduled. As another non-limiting example, the eNB can send the grant using cross carrier scheduling that allows scheduling data on another carrier. The carrier used for the grant transmission could be either licensed or unlicensed. By having unscheduled transmission of the first N transmission bursts, UL transmissions can avoid scheduling request (SR) delay and improve probability of getting access to the medium since UL transmission does not depend on UL grant reception.

In another aspect of this embodiment, unscheduled UL transmissions are confined in time to pre-specified opportunistic windows. As non-limiting examples, these windows may exclude the UE DMTC configured for the serving cell or neighbor cells, may exclude paging occasion windows of the eNB, and may exclude measurement gaps configured for RRM. As another non-limiting example, the eNB may explicitly signal specific subframes in which unscheduled transmissions are allowed.

In another aspect of this embodiment, the UE may send a UL transmission burst of new data based on an explicit grant from the eNB, and send an unscheduled retransmission for the data in the first burst if a new UL grant or HARQ ACK/NACK is not received from the eNB within a pre-specified time window. The redundancy version (RV) used for the retransmission may for example be the subsequent RV of the initial transmission, or be the same RV as the initial transmission.

According to an embodiment, during the unscheduled access, if the intended unlicensed channel for uplink transmission is busy, the UE can keep trying attempting to transmit data in the unlicensed channel using the unscheduled mode until the earliest opportunity to transmit the SR on any of the available carriers including other unlicensed carriers or licensed carriers. If UE is not able to transmit with the unscheduled mode, then the UE will transmit the SR to inform the eNB about its buffer. The eNB needs some time to decode the SR message and transmit the UL grant. The UE can deactivate the unscheduled mode after the SR is sent, or stay in the unscheduled mode and try to transmit the uplink data until the grant is received. In this case, the scheduling request delay is avoided by not idly waiting for the SR and the grant to be received and still inform the eNB about the buffer status at the earliest possible, either by the SR or by successful unscheduled uplink transmission.

According to an embodiment, during the unscheduled access, the UE needs to imbed UE ID in the first UL burst for the eNB so that the eNB can distinguish the source of the received data. In one non-limiting example, the UE ID (e.g., C-RNTI) is transmitted in the first SC-FDMA symbol of the unscheduled transmission since the first symbol may be partly utilized for UL LBT. In another non-limiting example, the UE ID is transmitted in the first SC-FDMA symbol of every unscheduled UL subframe.

In a further non-limiting example, the UE transmits the corresponding DCI of the UL transmission. The DCI has the same format and error correction coded as if it was prepared by an eNB for a PDCCH or an EPDCCH (see Section 2.1.1.3). The encoded bits can be transmitted in the first SC-FDMA symbol of the unscheduled transmission. The transmission can be present in the first subframe or in every subframe of every unscheduled UL transmission. The DCI allows the eNB to check the identity of the transmitting UE because the CRC bits are scrambled by the UE C-RNTI; and to correctly receive the UL transmission based on the transmission formats and parameters provided in the DCI. According to an alternative embodiment, it is possible to scramble the PUSCH CRC with the UE C-RNTI as an additional check.

According to an embodiment, during the unscheduled mode, after a successful LBT, the UE can transmit using the full available bandwidth. However, if more than one UE, served by the same eNB, finish their back off at the same time and start simultaneous transmission, they will collide with each other and the sub frame might be wasted. To minimize this problem, each UE can transmit using a portion of the full bandwidth (referred to as interlace). Different interlaces do not overlap in frequency, and therefore UEs will not interfere with each other. The UE can select a certain interlace for transmission randomly or based on certain criteria. As a non-limiting example, interlace selection can be randomized based on UE ID. Another non-limiting example includes that different interlace assignment can be coordinated by eNB by informing to UEs in the unscheduled mode via downlink transmission such as PDSCH or PDCCH.

According to an embodiment, switching between unscheduled and scheduled mode can be decided by the UE itself or by the serving eNB. The eNB can mandate a specific UE or a group of UEs to deactivate the unscheduled or scheduled mode based on different criteria such as the number of UEs with active transmissions, rate of collisions, BSR. For instance, at high load conditions, when large number of nodes would have to contend in order to access the medium, it is not efficient to use unscheduled mode due to the high number of potential collisions. In a non-limiting example, this information may be carried on the C-PDCCH or another PDCCH sent in the common search space. Another important criterion can be the buffer size ratio between eNB and serving UEs. If the buffer size of eNB is larger than aggregate reported buffer size of UEs, the scheduled mode can be enforced in order to reduce collisions due to downlink transmission and uplink transmissions in the same cell.

According to an embodiment, prioritization between a scheduled transmission and an unscheduled transmission can be done in both time and frequency domain(s). In a non-limiting example, prioritization in the time domain by setting the starting time of the scheduled uplink transmission burst later than that for the scheduled uplink transmissions if both have the same back-off. In another non-limiting example, prioritization in the frequency domain can be achieved by allowing the eNB to reserve M interlaces for unscheduled transmission via SIB or C-PDCCH, these M interlaces are not used for scheduled transmissions, and the number of interlaces for unscheduled transmission is lower than that for scheduled transmissions.

Figure 9:
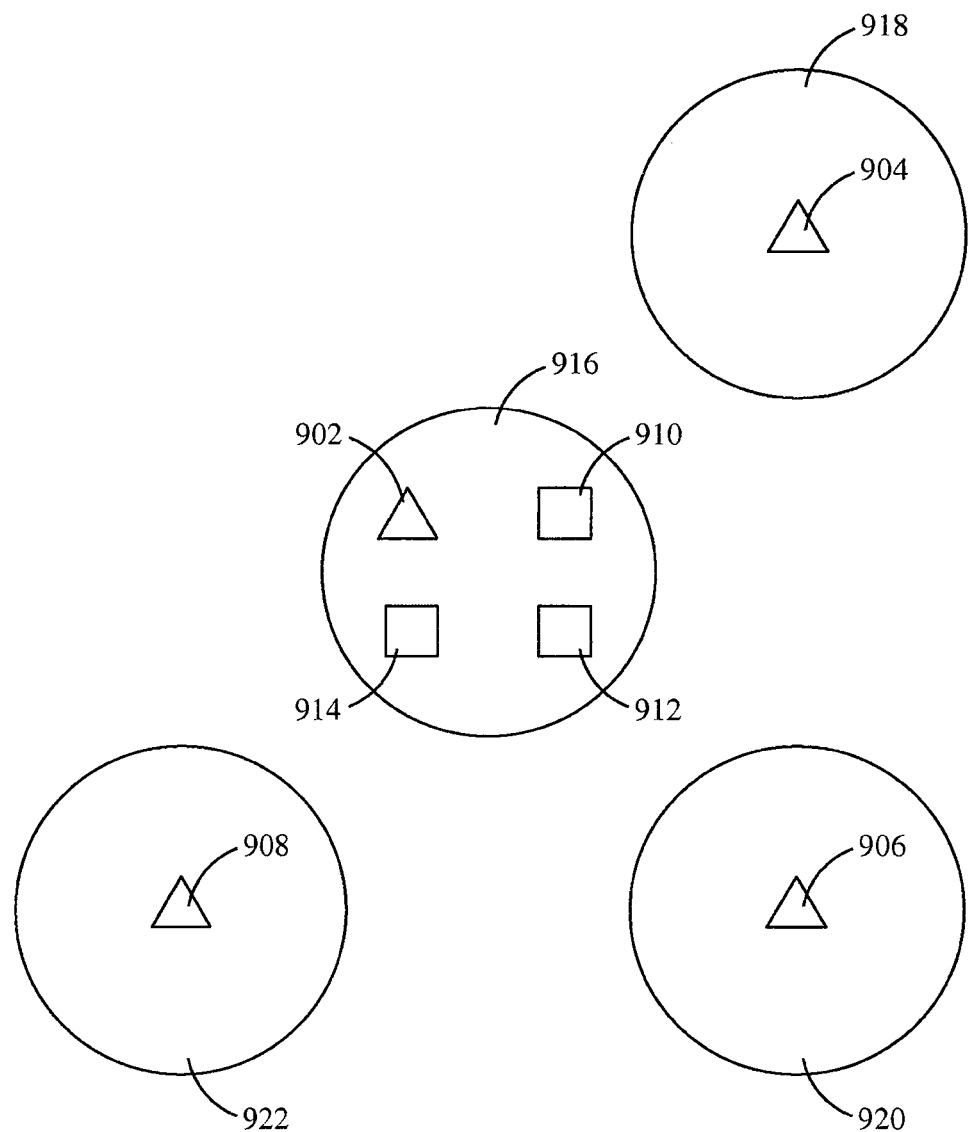
FIG. 9 shows an eNodeB (eNB) with a plurality of user equipments (UEs) and neighboring eNBs according to an embodiment.

According to an embodiment, the scheduling mode switch can also consider the impact to the neighboring eNBs. A non-limiting example is now described with respect to FIG. 9. An eNB 902 in a first cell 916 which includes a plurality of active UEs 910, 912 and 914, informs neighboring eNBs 904, 906 and 908 (each of which has their own cell 918, 920, and 922, respectively) whenever the unscheduled mode is activated. Then, if any neighboring eNBs experience interference level increase above a certain threshold, they indicate the eNB in the unscheduled mode to change to the scheduled mode in order to reduce the excessive interference due to the unscheduled mode. The information exchange between eNBs can be done via X2 interface.

According to an embodiment, in the unscheduled mode, the multiple UEs can be hidden each other so that LBT may not properly work which leads to unwanted uplink collisions. The user grouping for the unscheduled mode can further consider this aspect. In a non-limiting example, the eNB activates only UEs which are in the sensing range to let them rely on LBT for reducing collisions. The eNB can estimate which UEs are out of the sensing range based on UEs' measurement reports on the average interference level.

In the unscheduled mode, although UEs can hear each other, they might still collide due to unlucky choice of random backoff. According to an embodiment, this can be mitigated if eNB also control different UEs in the unscheduled mode by assigning the different backoff offset. Different backoff offset makes UEs wait a slightly more but in a different amount of time. This allows minimizing the simultaneous uplink transmissions. In a non-limiting example, the backoff offset can be function of the contention window size so that each UE may apply different offset according to the contention window size. This assignment from eNB can be done via PDCCH or PDSCH. By doing so, the collisions can be also minimized even at the unscheduled mode.

Figure 10:
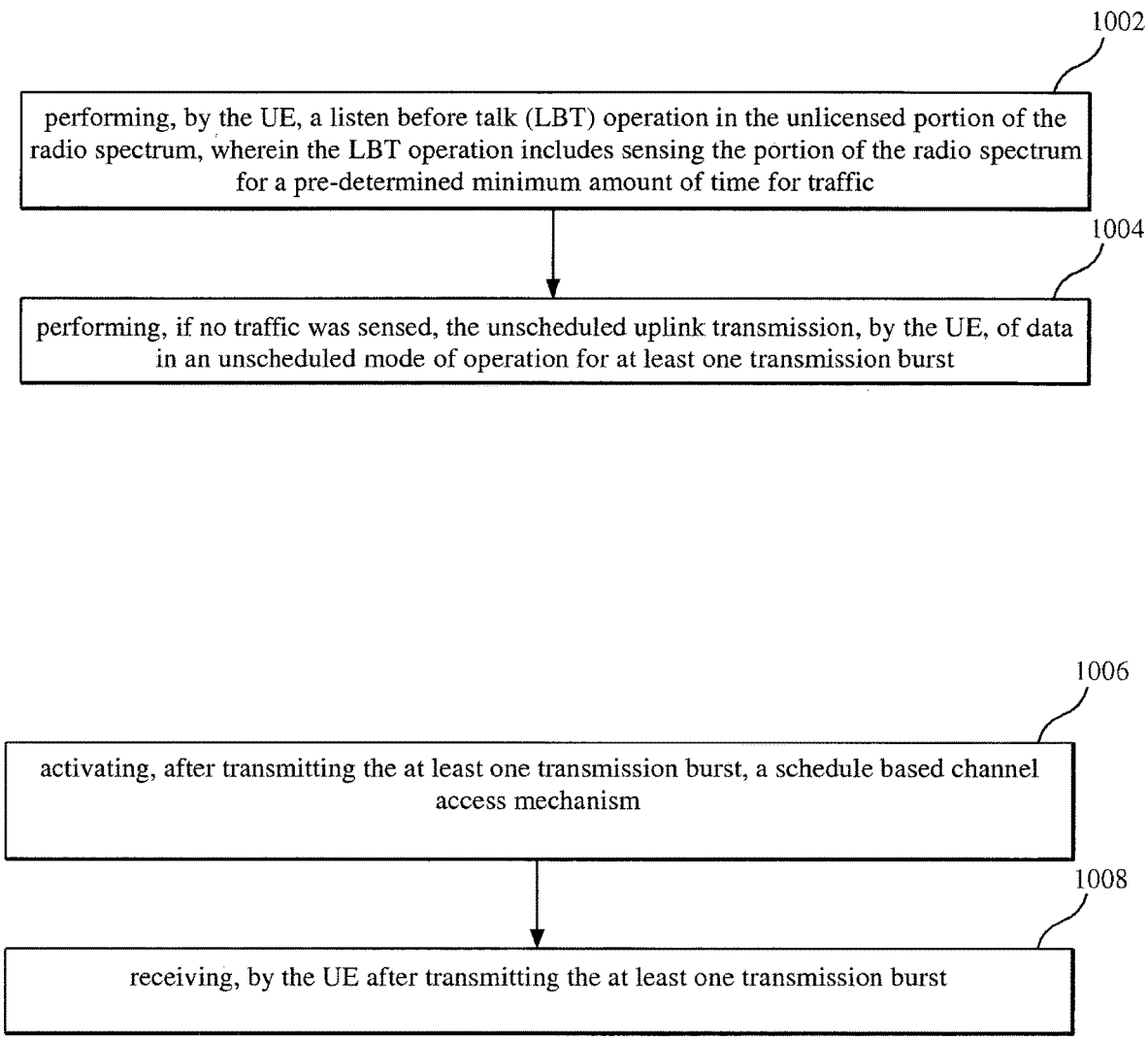
FIG. 10 shows a flowchart of a method according to an embodiment.
Figure 10:
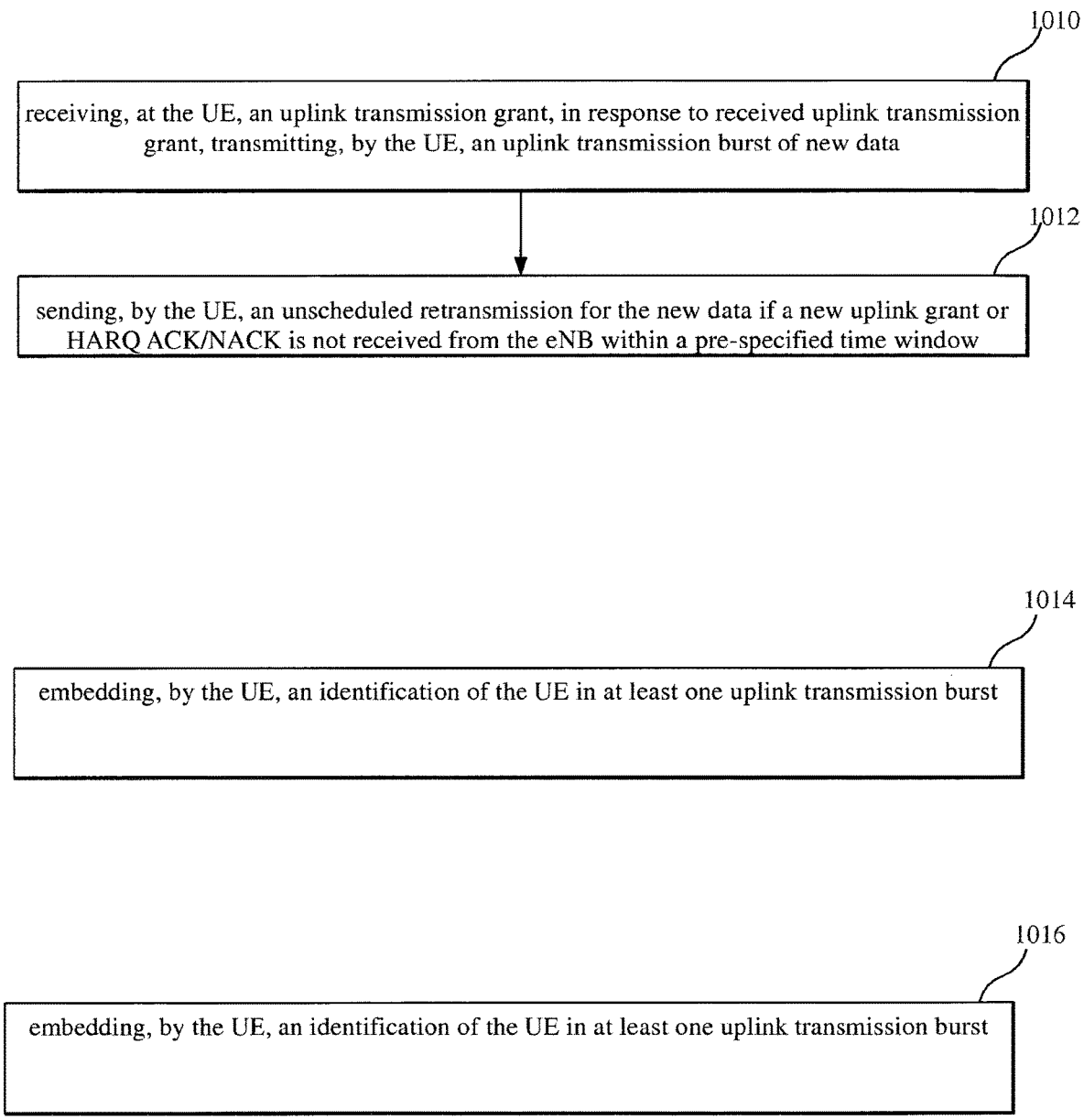

According to an embodiment there is a method for performing an unscheduled uplink transmission by a user equipment (UE) in an unlicensed portion of a radio spectrum as shown in FIG. 10. The method includes: in step 1002, performing, by the UE, a listen before talk (LBT) operation in the unlicensed portion of the radio spectrum, wherein the LBT operation includes sensing the portion of the radio spectrum for a pre-determined minimum amount of time for traffic; and in step 1004, performing, if no traffic was sensed, the unscheduled uplink transmission, by the UE, of data in an unscheduled mode of operation for at least one transmission burst.

The method may further include step 1006, activating, after transmitting the at least one transmission burst, a schedule based channel access mechanism, wherein an eNodeB (eNB) controls the UE's uplink access and step (1008) receiving, by the UE after transmitting the at least one transmission burst, an uplink transmission grant via cross carrier scheduling. Alternatively, the method may include step 1006, activating, after transmitting the at least one transmission burst, a schedule based channel access mechanism, wherein an eNodeB (eNB) controls the UE's uplink access; and step (1008) receiving, by the UE after transmitting the at least one transmission burst, an uplink transmission grant on the same carrier as the data transmissions is scheduled.

The method may also include step 1010, receiving, at the UE, an uplink transmission grant, and in response to received uplink transmission grant, transmitting, by the UE, an uplink transmission burst of new data. In step 1012 the UE sends an unscheduled retransmission for the new data if a new uplink grant or HARQ ACK/NACK is not received from the eNB within a pre-specified time window. Step 1014 includes embedding an identification of the UE in a first of the least one uplink transmission burst when in the unscheduled mode of operation, wherein the identification of the UE is embedded in a first single carrier frequency division multiple access (SC-FDMA) symbol of the first of the least one uplink transmission burst. Alternatively, step 1014 may include embedding the identification of the UE in a first SC-FDMA symbol of every uplink transmission burst when in an unscheduled mode of operation. Step 1016 includes prioritizing between a scheduled uplink transmission burst and an unscheduled uplink transmission burst by having different transmission start times when if both transmission bursts have a same back-off timing.

Figure 11:
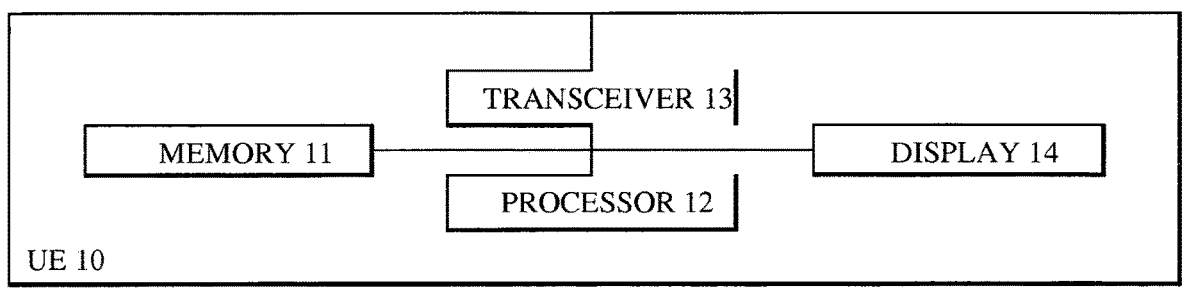
FIG. 11 shows a UE according to an embodiment.

According to embodiments, products, services and associated updates can be provisioned to a customer's contract for use on a user equipment (UE) and/or other devices. An example of such a UE is shown in FIG. 11. The UE 10 includes a processor 12 for executing instructions, a display 14 which can display information associated with various products and services, a memory 11 which stores information and a transceiver 13 for communicating with nodes of communication networks, e.g., the eNB, as well as other UEs and devices. The UE may be configured to perform the method step described above.

Figure 12:
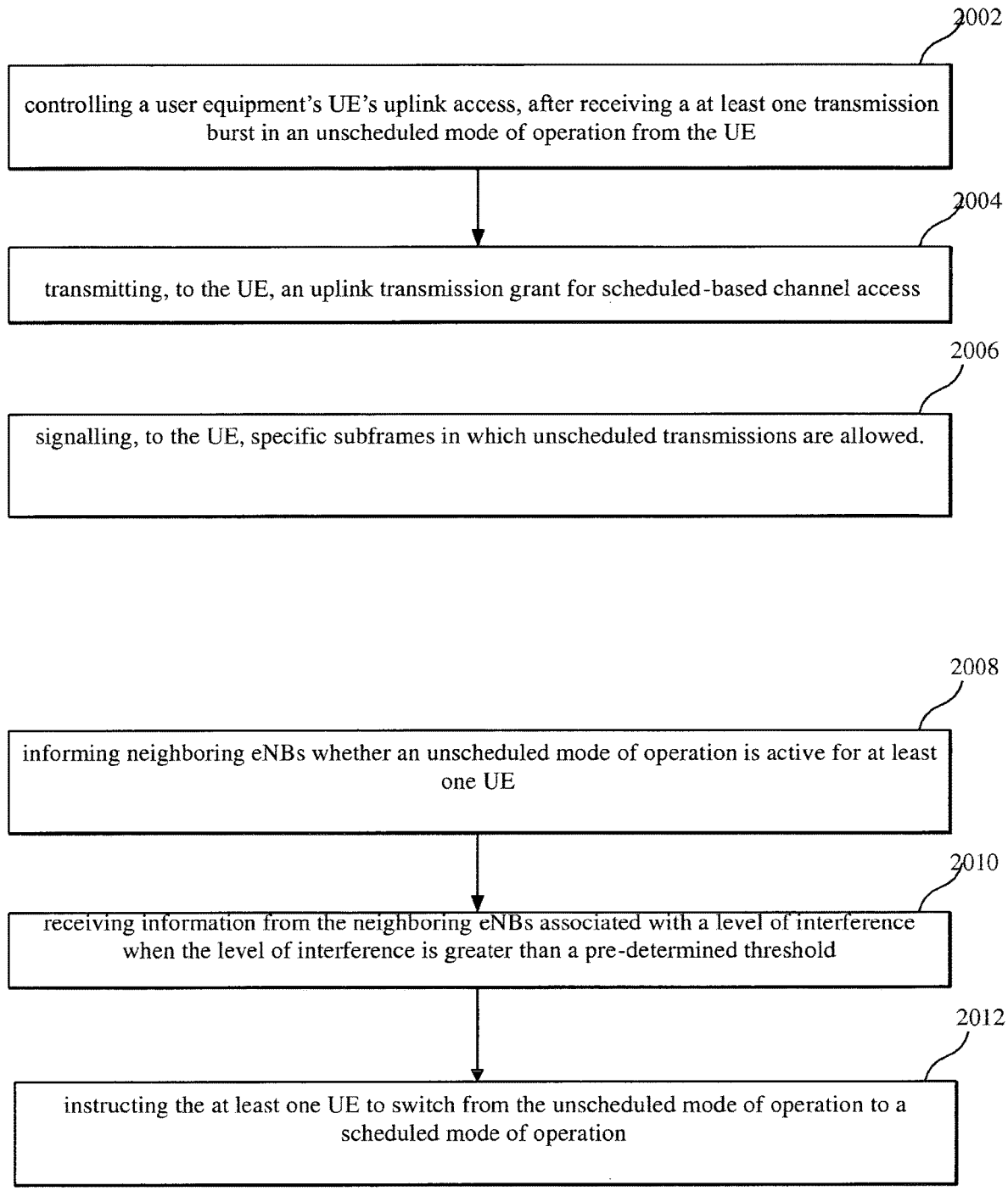
FIG. 12 shows a flowchart of a method according to an embodiment.

According to an embodiment there is a method for an eNB as shown in FIG. 12. The method is directed to an unscheduled uplink transmission in an unlicensed portion of a radio spectrum. The method includes, step 2002, controlling a user equipment's UE's uplink access, after receiving a at least one transmission burst in an unscheduled mode of operation from the UE, using a schedule based channel access mechanism; where controlling the UE's uplink access includes transmitting, step 2004, to the UE, an uplink transmission grant for scheduled-based channel access.

The method may also include, step 2006, signaling, to the UE, specific subframes in which unscheduled transmissions are allowed. In step 2008, the eNB informs neighboring eNBs whether an unscheduled mode of operation is active for at least one UE and receives information from the neighboring eNBs associated with a level of interference when the level of interference is greater than a pre-determined threshold, step 2010, and finally in step 2012 the eNB instructs the at least one UE to switch from the unscheduled mode of operation to a scheduled mode of operation. The method may also include step 2014 activating UEs to operate in an unscheduled mode of operation that are in a sensing range of each other, wherein the eNB estimates which UEs are out of the sensing range based on the UEs measurement reports which include an average interference level. Further the method may include step 2016, assigning a different backoff offset to each UE which is operating in an unscheduled mode of operation, wherein the backoff offset is a function of a contention window size.

Figure 13:
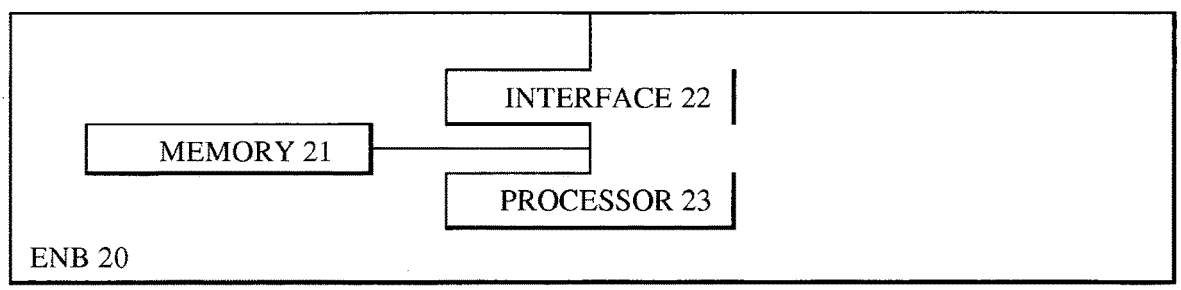
FIG. 13 depicts an eNB according to an embodiment.

According to an embodiment, an eNB (or base station) can be used to implement the various embodiments described herein, e.g., determining when the UE is to operate in an unscheduled mode or a scheduled mode. An example of such a eNB 20 is shown in FIG. 13. The eNB includes a processor 23 for executing instructions, a memory 21 for storing information and an interface 22 for communicating with other nodes and devices in support of operations associated UE uplink transmissions. The eNB may be configured to perform the method step described above.

Functional modules or circuit architecture may be implemented in the UE (10). The embodiments at least functionally include a first performing module for performing a listen before talk, LBT, operation in the unlicensed portion of the radio spectrum. The LBT operation includes sensing the portion of the radio spectrum for a pre-determined minimum amount of time for traffic. The embodiments further include a second performing module, which, if no traffic was sensed, is for performing the unscheduled uplink transmission, by the UE, of data in an unscheduled mode of operation for at least one transmission burst.

Functional modules or circuit architecture may be implemented in the eNB (20). The embodiments at least functionally include a controlling module for controlling a UE's (10) uplink access, after receiving a at least one transmission burst in an unscheduled mode of operation from the UE, using a schedule based channel access mechanism. The embodiments further include a transmitting module for transmitting, to the UE, an uplink transmission grant for scheduled-based channel access.

The disclosed embodiments provide methods and devices for avoiding batch updates to the customer base by instead using global entities. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the invention. However, one skilled in the art would understand that various embodiments may be practiced without such specific details.

As also will be appreciated by one skilled in the art, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

ABBREVIATIONS

| Abbreviation | Explanation |
| --- | --- |
| BSR | Buffer Status Request |
| CC | Component Carrier |
| CCA | Clear Channel Assessment |
| CQI | Channel Quality Information |
| CRC | Cyclic Redundancy Check |
| DCI | Downlink Control Information |
| DL | Downlink |
| DMTC | DRS Measurement Timing Configuration |
| DRS | Discovery Reference Signal |
| eNB | evolved NodeB, base station |
| UE | User Equipment |
| UL | Uplink |
| LAA | Licensed-Assisted Access |
| SCell | Secondary Cell |
| STA | Station |
| LBT | Listen-before-talk |
| LTE-U | LTE in Unlicensed Spectrum |
| PDCCH | Physical Downlink Control Channel |
| PMI | Precoding Matrix Indicator |
| PUSCH | Physical Uplink Shared Channel |
| RAT | Radio Access Technology |
| RNTI | Radio Network Temporary Identifier |
| TXOP | Transmission Opportunity |
| UL | Uplink |

The invention claimed is:

1. A method, for a user equipment, UE, for performing an unscheduled uplink transmission in an unlicensed portion of a radio spectrum, the method comprising:
performing, by the UE, a listen before talk, LBT, operation in the unlicensed portion of the radio spectrum, wherein the LBT operation comprises sensing the unlicensed portion of the radio spectrum for a pre-determined minimum amount of time for traffic; and, if no traffic was sensed;
performing the unscheduled uplink transmission, by the UE, of data in an unscheduled mode of operation for at least one transmission burst, wherein performing the unscheduled uplink transmission, by the UE, of data in an unscheduled mode of operation for at least one transmission burst is repeated until an earliest opportunity to transmit a scheduling request, SR, occurs, and wherein the transmission of the SR can occur on one of a licensed carrier or an unlicensed carrier.

2. The method of claim 1, further comprising:
activating, after transmitting the at least one transmission burst, a schedule based channel access mechanism, wherein—the eNB controls the UE's uplink access; and
receiving, by the UE, after transmitting the at least one transmission burst, the uplink transmission grant via cross carrier scheduling.

3. The method of claim 2, wherein the uplink transmission grant allows for scheduling the data on another carrier in a licensed portion or the unlicensed portion of the radio spectrum.

4. The method of claim 1, further comprising:
activating, after transmitting the at least one transmission burst, a schedule based channel access mechanism, wherein the eNB controls the UE's uplink access; and
receiving, by the UE after transmitting the at least one transmission burst, the uplink transmission grant on the same carrier as the data-transmission is scheduled.

5. The method of claim 1, wherein the unscheduled uplink transmissions are restricted in time to pre-specified time windows.

6. A method, for an eNodeB, eNB, for an unscheduled uplink transmission in an unlicensed portion of a radio spectrum, the method comprising:
controlling a user equipment's, UE's, uplink access, after receiving at least one transmission burst in an unscheduled mode of operation from the UE, using a schedule based channel access mechanism; wherein controlling the UE's uplink access comprises:
transmitting, to the UE, an uplink transmission grant for scheduled-based channel access;
wherein receiving the at least one transmission burst is repeated until an earliest opportunity for the UE to transmit a scheduling request, SR, occurs, and wherein the transmission of the SR can occur on one of a licensed carrier or an unlicensed carrier.

7. The method of claim 6, wherein the uplink transmission grant is transmitted via cross carrier scheduling.

8. The method of claim 6, wherein the uplink transmission grant is transmitted on the same carrier as the data-transmission is scheduled.

9. The method of claim 6, wherein the unscheduled uplink transmissions are restricted in time to the pre-specified time windows.

10. The method of claim 9, further comprising:
signaling, to the UE, specific sub-frames in which unscheduled transmissions are allowed.

11. The method of claim 6, wherein the at least one uplink transmission burst has embedded identification of the UE.

12. A User Equipment, UE, configured to perform an unscheduled uplink transmission in an unlicensed portion of a radio spectrum, the UE comprising a processor, a memory, and transceiver, said memory comprising instructions executable by said processor and by said transceiver whereby the UE is operative to:
perform a listen before talk, LBT, operation in the unlicensed portion of the radio spectrum, wherein the LBT operation comprises sensing the unlicensed portion of the radio spectrum for a pre-determined minimum amount of time for traffic; and, if no traffic was sensed,
perform the unscheduled uplink transmission, by the UE, of data in an unscheduled mode of operation for at least one transmission burst, wherein performing the unscheduled uplink transmission, by the UE, of data in an unscheduled mode of operation for at least one transmission burst is repeated until an earliest opportunity to transmit a scheduling request, SR, occurs, and wherein the transmission of the SR can occur on one of a licensed carrier or an unlicensed carrier.

13. The UE of claim 12, further operative to:
activate, after transmitting the at least one transmission burst, a schedule based channel access mechanism, wherein—the eNB controls the UE's uplink access; and
receive, after transmitting the at least one transmission burst, the uplink transmission grant via cross carrier scheduling.

14. The UE of claim 13, wherein the uplink transmission grant allows for scheduling the data on another carrier in a licensed portion or the unlicensed portion of the radio spectrum.

15. The UE of claim 12, further operative to:
activate, after transmitting the at least one transmission burst, a schedule based channel access mechanism, wherein the eNB controls the UE's uplink access; and
receive, after transmitting the at least one transmission burst, the uplink transmission grant on the same carrier as the data-transmission is scheduled.

16. The UE of claim 12, wherein the unscheduled uplink transmissions which are restricted in time to the pre-specified time windows.

17. An eNodeB, eNB, configured for an unscheduled uplink transmission in an unlicensed portion of a radio spectrum, the eNB comprising a processor, a memory, and an interface, said memory comprising instructions executable by said processor and by said interface, whereby the eNB is operative to:
control a user equipment's, UE's, uplink access, after receiving at least one transmission burst in an unscheduled mode of operation from the UE, using a schedule based channel access mechanism; wherein controlling the UE's uplink access comprises:
transmit, to the UE, an uplink transmission grant for scheduled-based channel access;
wherein receiving the at least one transmission burst is repeated until an earliest opportunity for the UE to transmit a scheduling request, SR, occurs, and wherein the transmission of the SR can occur on one of a licensed carrier or an unlicensed carrier.

18. The eNB of claim 17, further operative to:
inform neighboring eNB s whether the unscheduled mode of operation is active for at least one UE;
receive information from the neighboring eNB s associated with a level of interference when the level of interference is greater than a pre-determined threshold; and
instruct the at least one UE to switch from the unscheduled mode of operation to a scheduled mode of operation.

* * * * *